United States Patent [19]
Fujimura et al.

[11] 3,903,026
[45] Sept. 2, 1975

[54] RUBBER COMPOSITION FOR ADHERING ZINC OR ZINC ALLOY PLATED STEEL

[75] Inventors: Takashi Fujimura; Kazuo Mori, both of Yokohama; Gaku Ibuki, Fujisawa; Iichi Inomata, Akigawa; Yukihisa Takeda, Kodaira; Mikihiko Ikegami, Musashino; Hayao Niiyama, Higashi-Murayama, all of Japan

[73] Assignee: Bridgestone Tire Company Limited, Tokyo, Japan

[22] Filed: Dec. 17, 1973

[21] Appl. No.: 425,584

[30] Foreign Application Priority Data
Dec. 21, 1972 Japan............................ 47-128411
Dec. 28, 1972 Japan............................... 48-1110

[52] U.S. Cl.... 260/23.7 M; 260/23.7 R; 260/42.47; 260/45.7 R; 260/45.75 M; 260/754
[51] Int. Cl...................... C08c 11/08; C08c 11/36
[58] Field of Search......... 260/23.7 M, 23.7 R, 754, 260/45.7 R, 45.75 M, 42.47

[56] References Cited
UNITED STATES PATENTS
| | | | |
|---|---|---|---|
| 3,367,903 | 2/1968 | Deis et al. | 260/45.7 R |
| 3,429,849 | 2/1969 | Kroes et al. | 260/45.7 R |
| 3,514,370 | 5/1970 | Canevari | 260/23.7 R |
| 3,597,387 | 8/1971 | Starr et al. | 260/45.7 R |
| 3,649,587 | 3/1972 | Beckman et al. | 260/23.7 M |

OTHER PUBLICATIONS
Rubber World–Materials & Compounding Ingredients for Rubber (Bill Publications),(N.Y.),(1968), pp. 85–86, TS 1890 I 53

*Primary Examiner*—Donald E. Czaja
*Assistant Examiner*—H. H. Fletcher
*Attorney, Agent, or Firm*—Sughrue, Rothwell, Mion, Zinn and Macpeak

[57] ABSTRACT

A rubber composition containing cobalt carboxylate for adhering to zinc of zinc alloy plated steel is compounded with 0.1 to 4.0 parts of magnesium oxide per 100 parts of rubber by weight so as to retain a high adhesion even after thermal aging.

5 Claims, 1 Drawing Figure

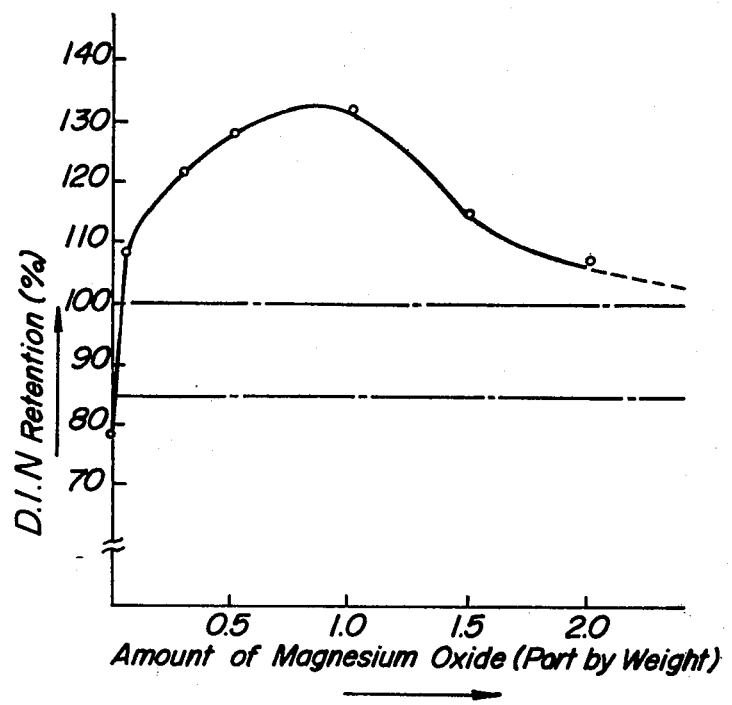

RUBBER COMPOSITION FOR ADHERING ZINC OR ZINC ALLOY PLATED STEEL

The present invention relates to a rubber composition for adhering to zinc or zinc alloy plated steel, which is able to retain an improved adhesive property even after thermal aging.

Many prior arts have been reported as a method of adhering a highly unsaturated rubber such as natural rubber, butadiene rubber and styrene-butadiene copolymer rubber to a steel cord and in general, there is performed a method wherein an organic salt of cobalt is additionally used for a rubber composition as described in Japanese Patent Application Publication No. 29,739/69. It is particularly known that a rubber composition produced by compounding natural rubber, synthetic rubber or their mixture with cobalt naphthenate has an excellent adhesive property to the steel cord. In this case, however, there are disadvantages that an adhesion gradually lowers as thermal aging proceeds and that the resulting product is difficult to retain a high adhesion for a long period.

Furthermore, it is a common practice to compound a rubber with magnesium oxide, and also the magnesium oxide is used not only as a vulcanizing agent for halogen-containing rubber but also as an inorganic accelerator or processing aid for natural rubber and synthetic rubber.

Moreover, magnesium oxide is often compounded into a rubber composition containing a compound agent other than cobalt carboxylate and having an excellent adhesive property to a metal. In this case, the amount of magnesium oxide added is more than 5 parts by weight, for example, as seen from Japanese Patent application Publication No. 11,252/71. When the amount of magnesium oxide is less than 5 parts by weight, however, it has been considered that the resulting rubber composition is very poor for adhering to a steel cord.

An object of the present invention is to solve the above described disadvantages and to provide a rubber composition having a high adhesion to zinc or zinc alloy plated steel and an excellent thermal aging resistance.

The present invention consists in a rubber composition containing cobalt carboxylate for adhering to zinc or zinc alloy plated steel which comprises compounding 0.1 to 4.0 parts by weight of magnesium oxide per 100 parts by weight of rubber.

The rubber to be used in the present invention includes vulcanizable rubbers such as natural rubber, polyisoprene rubber, polybutadiene rubber, styrene-butadiene copolymer rubber (SBR), and a mixture thereof. Among them, a natural rubber - containing rubber is particularly preferable.

The term "steel" used herein is understood to include steel cord, steel plate and the like, but for convenience sake, the present invention will be explained with respect to the steel cord hereinafter.

The steel cord used in the present invention is one plated with zinc or zinc alloy, particularly brass. In the zinc plating, a Galvano method wherein a current density is high and a treating time is short is more preferably used.

When brass plated steel cord to be used in the present invention is manufactured, copper (Cu) and zinc (Zn) as brass plating components are usually used in a weight ratio of Cu/Zn of 55/45 to 80/20, preferably 70/30.

According to the present invention, the rubber is compounded with cobalt carboxylate in order to adhere the rubber composition to the steel cord and further magnesium oxide is added in order to retain the adhesion of the rubber to the cord after aging. For this purpose, the amount of magnesium oxide to be added is 0.1 to 4.0 parts by weight per 100 parts by weight of the rubber.

In the adhering of the rubber composition to the zinc plated steel cord, the amount of magnesium oxide is preferably 0.1 to 2.0 parts, more particularly 0.3 to 1.0 parts per 100 parts of the rubber by weight. Moreover, in the adhering of the rubber composition to the brass plated steel cord, the amount of magnesium oxide is preferably 0.5 to 4.0 parts, more particularly 1.0 to 3.0 parts per 100 parts of the rubber by weight.

When the amount of magnesium oxide exceeds 4.0 parts by weight, the adhesive property to the steel cord before aging is adversely affected, while when the amount is less than 0.1 part by weight, there is substantially no the addition effect.

As the cobalt carboxylate to be compounded with the rubber, use may be made of cobalt salts of cycloaliphatic acids such as cobalt naphthenate; cobalt salts of unsaturated fatty acids such as cobalt oleate; cobalt salts of saturated fatty acids such as cobalt stearate and the like, and among them cobalt naphthenate is particularly preferable. The amount of cobalt carboxylate to be compounded is not particularly restricted, but it is preferably 1 to 5 parts by weight per 100 parts by weight of the rubber. Because, when the amount of cobalt naphthenate as the cobalt carboxylate is less than 1 part by weight, the effect of the present invention cannot be satisfactorily achieved, while when the amount exceeds 5 parts by weight, the rubber is deteriorated and the cobalt carboxylate is not suitable as the compounding agent.

In the production of the rubber composition, ordinary compounding agents such as vulcanizing agent, vulcanizing activator, accelerator, filler, softener plasticizer, antioxidant and other processing aids are practically used together.

When the rubber composition of the present invention as mentioned above is used for adhering to zinc or zinc alloy such as brass, a high adhesion is obtained and further it is possible to retain such an adhesion even after the thermal aging. Therefore, the rubber composition of the present invention is more effective for applications of tire, hose, steel conveyor belt and the like.

The single FIGURE of the accompanying drawing is a graph showing the relation of the amount of magnesium oxide to D.I.N. retention.

The following examples are given in illustration of this invention and are not intended as limitations thereof. In the examples, "part" means by weight.

EXAMPLE 1

A rubber blend consisting of 70 parts of natural rubber, 10 of polybutadiene rubber and 20 parts of styrene-butadiene copolymer rubber (SBR) was compounded with various compounding agents and magnesium oxide (MgO) in the recipe as shown in the following Table 1 and the resulting rubber composition was vulcanized together with a zinc plated steel cord of 3.2 mm diameter in a peeling mold at 148°C for 30 minutes.

For the comparison, the above described procedure was repeated except that magnesium oxide was not added.

The peeling test was carried out at a peeling speed of 50 mm/min with respect to the thus obtained specimens, i.e., vulcanized rubber compositions including the steel cord, whereby an adhesive force of the rubber to the steel cord was measured. In this measurement, the value obtained by dividing the force, which is required for peeling the steel cord of 5 cm length from the vulcanized rubber composition at a peeling speed of 50 mm/min, by 5 is expressed as a steel peeling force.

Next, the specimens were aged at 140°C for 150 minutes and then subjected to the same peeling test as described above so as to measure a steel peeling force after aging.

The reduction of the adhesion due to aging is usually illustrated as retention percentage including a retention of adhesion and a D.I.N. retention. The retention of adhesion is expressed by the following equation:

$$\text{Retention of adhesion } (\%) = \frac{\text{Steel peeling force after aging}}{\text{Steel peeling force before aging}} \times 100$$

The D.I.N. retention is a retention of adhesion for steel cord standardized in Germany, and the standard value of D.I.N. retention is 60 Kg/cm for steel of 3.2 mm diameter. Therefore, the term "D.I.N. retention" used herein means to be expressed by the following equation:

$$\text{D.I.N. retention } (\%) = \frac{\text{Steel peeling force after aging}}{60 \text{ Kg/cm}} \times 100$$

The obtained test results are also shown in Table 1.

as compared with the case of adding no magnesium oxide.

Furthermore, the amount of magnesium oxide added was plotted on an abscissa and the D.I.N. retention was plotted on an ordinate as shown in the single FIGURE. It is understood from this FIGURE that the amount of magnesium oxide is preferably within the range of 0.1 to 2.0 parts by weight per 100 parts by weight of the rubber in order that the D.I.N. retention is more than 85 percent of the standard value.

EXAMPLE 2

Various rubber compositions were prepared in the recipe as shown in the following Table 2 using cobalt naphthenate as a cobalt carboxylate and changing the amount of magnesium oxide and then subjected to an adhesion test. A test specimen was manufactured by pressing a plurality of brass (Cu/Zn=70/30) plated steel cords, each having a diameter of 3.2 mm, on a sheet of the resulting rubber composition and vulcanizing the resulting pressed body at 148°C for 30 minutes.

The adhesion test was carried out by peeling the steel cords from the rubber sheet and the adhesion was measured by Kg/cord.

Moreover, the test specimen was aged at 140°C for 150 minutes and then subjected to the same adhesion test as described above.

For the comparison, the adhesion test was carried out

Table 1

| | Rubber Composition No. | 1 | 2 | 3 | 4 | 5 | 6 (Comparative) |
|---|---|---|---|---|---|---|---|
| Compounding recipe | Natural rubber | 70 | 70 | 70 | 70 | 70 | 70 |
| | Polybutadiene rubber | 10 | 10 | 10 | 10 | 10 | 10 |
| | SBR | 20 | 20 | 20 | 20 | 20 | 20 |
| | ZnO | 5 | 5 | 5 | 5 | 5 | 5 |
| | Accelerator*1 | 0.75 | 0.75 | 0.75 | 0.75 | 0.75 | 0.75 |
| | Antioxidant*2 | 2 | 2 | 2 | 2 | 2 | 2 |
| | Process oil | 5 | 5 | 5 | 5 | 5 | 5 |
| | HAF carbon black | 50 | 50 | 50 | 50 | 50 | 50 |
| | Sulfur | 5 | 5 | 5 | 5 | 5 | 5 |
| | Cobalt naphthenate | 3 | 3 | 3 | 3 | 3 | 3 |
| | MgO | 0.1 | 0.5 | 1.0 | 1.5 | 2.0 | — |
| Test results | Steel peeling force before aging (Kg/cm) | 101 | 101 | 95 | 85 | 81 | 101 |
| | Steel peeling force after aging (Kg/cm) | 65 | 77 | 79 | 72 | 62 | 47 |
| | Retention of adhesion | 64 | 76 | 83 | 85 | 77 | 47 |
| | D.I.N. retention | 108 | 128 | 132 | 120 | 103 | 78 |

*1Nocceler MSA (Trademark, made by Ouchi Shinko Kagaku Kogyo K.K.; N-oxydiethylene-2-benzothiazole sulfenamide)
*2Nocrac C (Trademark, made by Ouchi Shinko Kagaku Kogyo K.K.; phenyl-β-naphthylamine)

As seen from Table 1, when magnesium oxide is added as a compounding agent, the steel peeling force before aging does not substantially change, but the steel peeling force after aging is considerably improved with respect to rubber compositions containing no cobalt naphthenate and/or magnesium oxide.

The obtained results are also shown in Table 2.

Table 2

| Rubber Composition No | 7 | 8 | 9 | 10 | 11 | 12 | 13 | 14 |
|---|---|---|---|---|---|---|---|---|
| | (Comparative) | | | | | | | |
| Natural rubber | 100 | 100 | 100 | 100 | 100 | 100 | 100 | 100 |

Table 2-continued

| Rubber Composition No | | 7 | 8 | 9 (Comparative) | 10 | 11 | 12 | 13 | 14 |
|---|---|---|---|---|---|---|---|---|---|
| Compounding recipe | Zinc white | 5 | 5 | 5 | 5 | 5 | 5 | 5 | 5 |
| | Thiazol series accelerator | 0.75 | 0.75 | 0.75 | 0.75 | 0.75 | 0.75 | 0.75 | 0.75 |
| | Phenyl-β-naphthylamine | 2 | 2 | 2 | 2 | 2 | 2 | 2 | 2 |
| | Process oil | 5 | 5 | 5 | 5 | 5 | 5 | 5 | 5 |
| | HAF carbon black | 50 | 50 | 50 | 50 | 50 | 50 | 50 | 50 |
| | Sulfur | 4 | 4 | 4 | 4 | 4 | 4 | 4 | 4 |
| | Cobalt naphthenate | — | — | 2 | 2 | 2 | 2 | 2 | 2 |
| | Magnesium oxide | — | 0.5 | — | 0.5 | 1 | 2 | 3 | 4 |
| Test results | Adhesion before aging (Index)* | 45 | 47 | 100 | 102 | 100 | 98 | 98 | 94 |
| | Adhesion after aging (Index)* | 42 | 47 | 51 | 60 | 78 | 97 | 88 | 62 |

*The index of adhesion before aging in rubber composition No. 9 was 100.

It can be seen from Table 2 that the rubber compositions (No. 10–14) according to the present invention are considerably superior in the adhesion after aging to the conventional rubber compositions (No. 7–9) and the adhesion before aging is substantially equal to that of the conventional rubber composition No. 9.

EXAMPLE 3

Various rubber compositions were prepared by using cobalt stearate, cobalt oleate or cobalt naphthenate as a cobalt carboxylate and changing the kind of the rubber as shown in the following Table 3 and then subjected to the same adhesion test as described in Example 2.

For the comparison, a rubber composition containing no magnesium oxide was prepared and subjected to the same adhesion test as described above.

The obtained test results are also shown in Table 3. It can be seen from Table 3 that the rubber composition according to the present invention exhibits a considerably high adhesion before and after the thermal aging.

What is claimed is:

1. A cured rubber composition containing 1 to 5 parts by weight cobalt carboxylate for adhering to zinc or zinc alloy plated steel which comprises 0.1 to 4 parts of magnesium oxide per 100 parts of rubber by weight, said rubber being selected from the group consisting of natural rubber, polyisoprene rubber, polybutadiene rubber, styrenebutadiene copolymer rubber, and mixtures thereof.

2. A rubber composition as claimemd in claim 1 wherein said zinc alloy is brass.

3. A rubber composition as claimed in claim 1 wherein said cobalt carboxylate is selected from the group consisting of cobalt naphthenate, cobalt oleate and cobalt stearate.

4. A rubber composition containing cobalt carboxylate for adhering to zinc plated steel as claimed in claim 1 wherein said amount of magnesium oxide is 0.1 to 2.0 parts by weight.

5. A rubber composition containing cobalt carboxylate for adhering to zinc alloy plated steel as claimed in claim 1 wherein said amount of magnesium oxide is 1.0 to 3.0 parts by weight.

Table 3

| Rubber Composition No. | | 9 | 15 (Comparative) | 16 | 17 (Comparative) | 18 | 19 (Comparative) | 20 |
|---|---|---|---|---|---|---|---|---|
| Compounding recipe | Natural rubber | 100 | 100 | 100 | 80 | 80 | 80 | 80 |
| | SBR No. 1500 | — | — | — | 20 | 20 | 20 | 20 |
| | Zinc white | 5 | 5 | 5 | 5 | 5 | 5 | 5 |
| | Thiazol series accelerator | 0.75 | 0.75 | 0.75 | 0.75 | 0.75 | 0.75 | 0.75 |
| | Phenyl-β-naphthylamine | 2 | 2 | 2 | 2 | 2 | 2 | 2 |
| | Process oil | 5 | 5 | 5 | 5 | 5 | 5 | 5 |
| | HAF carbon black | 50 | 50 | 50 | 50 | 50 | 50 | 50 |
| | Sulfur | 4 | 4 | 4 | 4 | 4 | 4 | 4 |
| | Cobalt naphthenate | 2 | — | — | 2 | 2 | — | — |
| | Cobalt stearate | — | 2 | 2 | — | — | — | — |
| | Cobalt oleate | — | — | — | — | — | 2 | 2 |
| | Magnesium oxide | — | — | 2 | — | 2 | — | 2 |
| Test results | Adhesion before aging (Index) | 100 | 83 | 87 | 76 | 80 | 75 | 78 |
| | Adhesion after aging (Index) | 51 | 43 | 81 | 38 | 71 | 36 | 70 |